Figure 1:
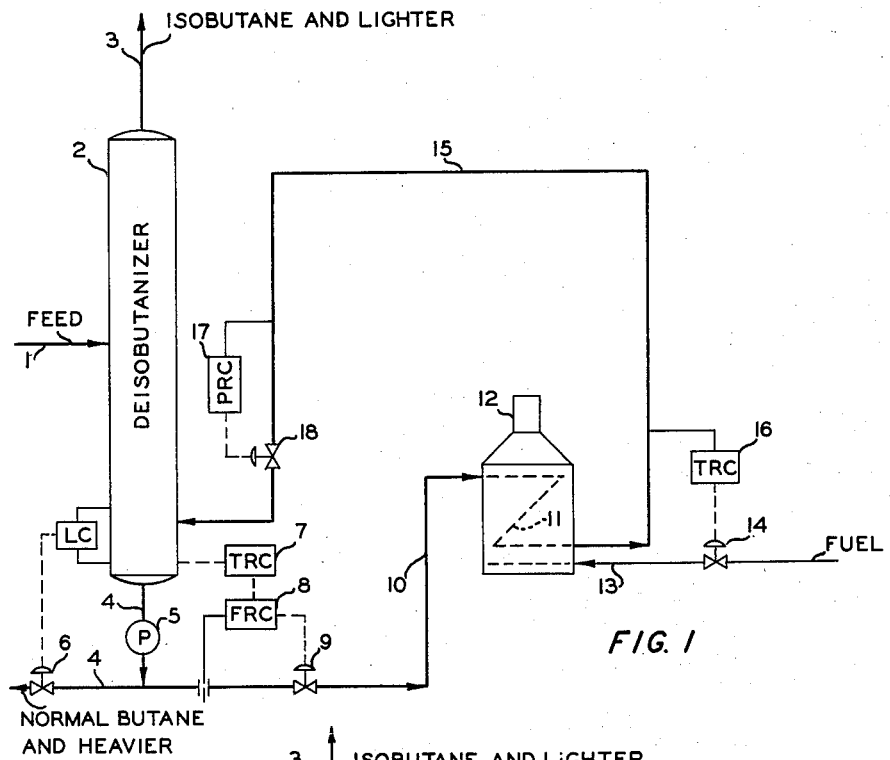

March 7, 1961 J. VAN POOL 2,974,182
FRACTIONATOR REBOILER OPERATION AND METHOD OF USING SAME
Filed Nov. 20, 1958

INVENTOR.
JOE VAN POOL
BY
Hudson & Young
ATTORNEYS

United States Patent Office 2,974,182
Patented Mar. 7, 1961

2,974,182

FRACTIONATOR REBOILER OPERATION AND METHOD OF USING SAME

Joe Van Pool, Bartlesville, Okla., assignor to Phillips Petroleum Company, a corporation of Delaware Filed Nov. 20, 1958, Ser. No. 775,222

8 Claims. (Cl. 260—683.42)

This invention relates to a fractionation reboiler operation. It also relates to an application or use. It also relates to a specific application or use of said operation. It also relates to apparatus for effectuating the same.

In one of its aspects the invention relates to the operation of a fractionation zone in conjunction with a heating zone to which a fractionated product is passed, and from which it is returned heated to a constant temperature and at a preset constant pressure to the fractionation zone, wherein the rate of flow of said product to said zone and from said heating zone to said fractionation zone is controlled responsive to a predetermined temperature of said product in said fractionation zone. In another of its aspects this invention relates to the operation of a fractionation zone in conjunction with a heating zone in which a fractionated product from the fractionation zone is heated to a constant temperature in the heating zone, and returned to the fractionation zone, wherein the pressure upon the effluent from the heating zone passing to the fractionation zone is controlled responsive to a predetermined temperature of said product in said fractionation zone while the rate of flow of said product to said heating zone and back to fractionation zone is maintained at a constant rate. In a still further aspect, in the operation as last described, the invention comprises overriding the controlling of the pressure responsive to the temperature in said fractionation zone in accordance with the content of a predetermined material in said fractionated product being yielded from said fractionation zone.

In a more specific aspect the invention contemplates heating the bottoms from an HF alkylation effluent deisobutanizer to cause thermal defluorination of the same and controlling such an operation as herein set forth and described, deisobutanizing said effluent in said deisobutanizer or fractionation zone and thermally defluorinating said effluent by heating the same in said heating zone, which in one instance, is a reboiler.

It is well known that for any given feed to a fractionating column with any given overhead and bottoms products (or purities) that the tower can be sized with respect to trays and reflux as long as neither is less than the minimum which can be determined by calculations. It is also known that in these calculations a graph of trays versus reflux is made with one limit being minimum reflux and the other limit being minimum trays. From this graph the optimum tower size is determined. It is also known from the above when the number of trays is set that the tower diameter, for a given overhead product, is dependent upon the quantity of reflux required.

From the above it follows that the tower reboiler duty depends upon three things: (1) sensible heat required to heat the bottoms product from feed temperature to the higher bottoms temperature, (2) latent heat to vaporize the overhead product, and (3) latent heat to vaporize the reflux.

After sizing the tower as above-described, correct conditions of reboil operation must be maintained in this process to effect thermal defluorination and yet not upset the tower operation.

It has been found to be desirable to operate at as high a temperature as possible for maximum defluorination, the upper limit being determined by the color of the alkylate product (about 400° to 450° F. maximum). With this temperature limitation it has been found that between 6–8, even to 10, volumes of bottoms must be circulated through the bottoms furnace for each volume of bottoms yield to effect sufficient contact time for desired defluorination. These conditions, however, provide too much reboiler duty (B.t.u.'s) for optimum tower operation at the desired tower operating pressure and temperature. This condition is governed to a large extent by the quantity of normal butane in the alkylate, i.e., as the normal butane content of the bottoms increases, the bubble point of the tower bottoms decreases, and the amount of vaporization in the reboiler furnace effluent increases.

Therefore, for a given circulation rate with an increase in normal butane, the B.t.u. input to the tower increases, requiring additional reflux to maintain the desired overhead purity. However, when the tower is operating at maximum load as in the usual case, any increase in reflux will result in tower flooding, and this flooding condition can be corrected by (1) reduced circulation (below 8 to 1 with insufficient defluorination), (2) reduced reboiler outlet temperature (below 400° F. with insufficient defluorination), or (3) increased tower size to allow for changes in load due to increased normal butane in the feed (which is impracticable with a presently operating tower). Furthermore, it is expensive to use an overdesigned or over-built tower.

While this invention will now be described more fully and in more detail as it applies to thermal defluorination of HF alkylate deisobutanizer bottoms, it will be understood by one skilled in the art in possession of this disclosure that there is provided a general physical modus operandi or a combination fractionation-heating operation which possesses general application.

It is an object of this invention to provide an improved operation of a fractionation zone in conjunction with a heating zone. Another object of this invention is to provide an improved combination of apparatus elements useful for effectively heating fractionator tower bottoms and returning the same to said fractionator with minimum heating duty required of said heating zone. A further object of this invention is to provide a method for thermal defluorination of HF alkylation effluent deisobutanizer bottoms with minimum load or heat duty being required of the reboiler in which the said bottoms are heated to a defluorination temperature and then recycled to the deisobutanizer.

Other aspects, objects, as well as the several advantages of the invention are apparent from a study of the disclosure, the drawings, and the appended claims.

According to the invention there is provided a fractionation operation wherein a fractionated product is cycled through a heating zone and returned to a fractionation zone thus to add heat to said fractionation zone which comprises heating said product in said heating zone to a constant heating zone effluent temperature and maintaining a constant temperature of said fractionated product in said fractionation zone by controlling one of the following: pressure of heating zone effluent returned to said fractionation zone responsive to the temperature of said fractionated product in said fractionation zone while maintaining a predetermined flow rate of said product from said fractionation zone to said heating zone and back to said fractionation zone, and the rate of flow of said product from said fractionation zone to said heating zone and back to said fractionation zone responsive to the temperature of said product in said fractionation zone while maintaining the pressure upon said heating zone effluent being returned to said fractionation zone at a constant predetermined value.

Also according to the invention there is provided an improved thermal defluorination of an HF alkylation effluent bottoms, which is conducted according to at least one of the methods of operating a fractionation zone in conjunction with a heating zone as herein set forth and described.

Still further according to the invention there are provided apparatus embodiments suited for executing the methods of the invention.

When the invention is employed simply to supply heat with minimum heat duty from a heating zone to a fractionation zone, the ratio of fractionated product passed through the heating zone and back to the fractionation zone to that removed from the system can be selected by one skilled in the art according to his particular objective.

In the invention as herein described for thermal defluorination of HF alkylation effluent deisobutanizer bottoms, my invention accounts for operating changes so that the optimum furnace outlet temperature (400° F.) is maintained, and so that, say, an 8–10 to 1 circulation rate is effected to produce desired defluorination, and yet to charge the proper amount of heat to the tower for optimum tower operation.

In the drawing:

Figure 1 diagrammatically illustrates application of the invention to defluorination of HF alkylation effluent deisobutanizer bottoms wherein the pressure on the heater effluent is hand preset and the flow from the tower to the heater and back to the tower is controlled responsive to the desired tower bottoms temperature.

Figure 2:
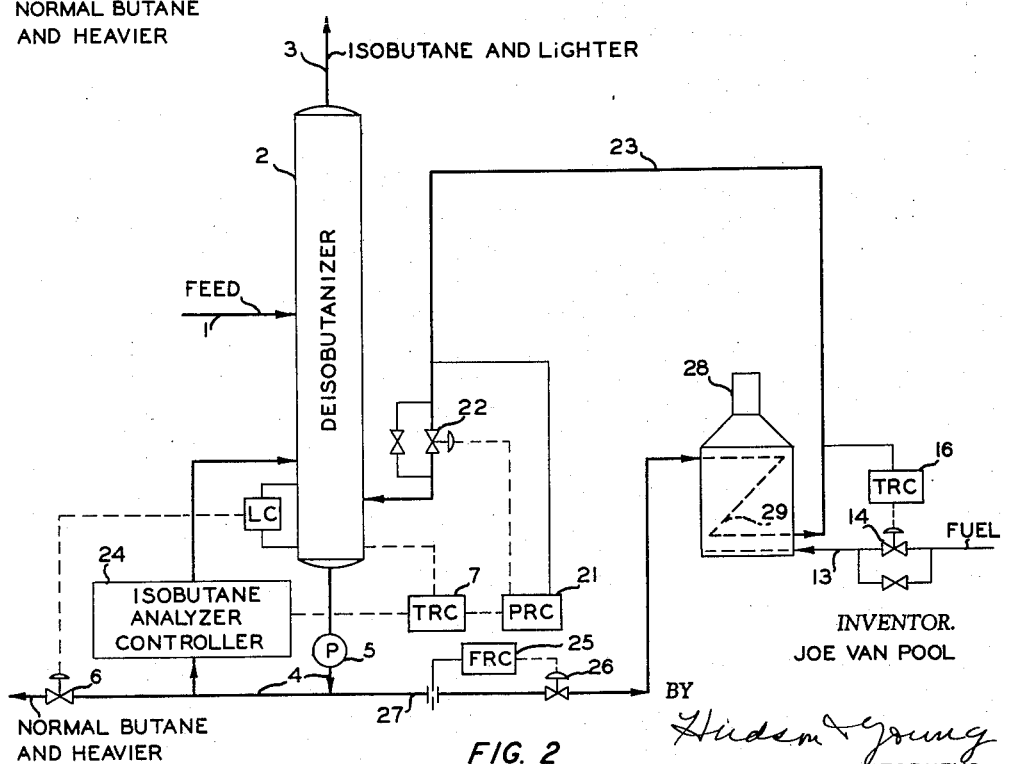

Figure 2 diagrammatically shows a similar application in which the flow from the tower to the heater and back to the tower is preset and the pressure on the heater effluent is controlled responsive to the desired tower bottoms temperature and in which the isobutane in the bottoms varies. The pressure to which tthe heater effluent is adjusted responsive to the temperature, is changed in accordance with the desired isobutane content of the bottoms.

Referring now to the embodiments shown in Figures 1 and 2 of the drawing, feed to be deisobutanized enters through pipe 1 into deisobutanizer 2 from which isobutane and lighter hydrocarbons and HF acid are taken through pipe 3. Deisobutanizer bottoms are removed by way of pipe 4 and pump 5 and go to normal butane and heavier storage for treatment, as will be understood by one skilled in the art, by way of valve 6, which is on an automatic liquid level control, as shown.

Generally, bottoms from the deisobutanizer are passed to heater 12 (Figure 1) and heater 28 (Figure 2) wherein defluorination as described herein takes place. The defluorinated bottoms, according to the invention, are returned through pressure control valves 18 (Figure 1) and 22 (Figure 2) to deisobutanizer 2.

The bottom of deisobutanizer 2 is equipped with temperature recorder controller 7.

To the extent just described, Figures 1 and 2 are identical.

Referring now only to Figure 1, the controller 7 resets a flow recorder controller 8, which controls valve 9 in pipe 10, which passes bottoms from tower 2 into heater coil 11 in furnace 12. The furnace is automatically fired to maintain a predetermined effluent temperature, in this case 400° F. Thus, fuel supplied to the furnace burner by pipe 13 is controlled by valve 14, which operates responsive to the temperature of the furnace effluent in pipe 15, this temperature being continuously sensed by temperature recorder controller 16, which controls valve 14. A hand set pressure recorder controller 17 operates valve 18 in pipe 15, which returns the treated bottoms to tower 2.

Thus, in Figure 1, as the feed to tower 2 increases, at same quality, the tower temperature will start to fall because of the additional quantity of material to be heated and vaporized. The decrease in temperature is sensed by temperature recorder controller 7, which resets flow recorder controller 8, which effects a further opening of valve 9 in pipe 10, increasing the flow of deisobutanizer bottoms to furnace 12. As the increased flow enters furnace 12 and the effluent temperature correspondingly starts to fall, temperature recorder controller 16 will open valve 14 to supply more fuel by way of pipe 13 to the furnace until the effluent temperature has once again reached 400° F. It will be appreciated by one skilled in the art that variations which are sensed are, indeed, slight and that corrections are made almost immediately. The pressure on the furnace will remain at its preset value, which is maintained by valve 18 and pressure recorder controller 17.

Thus, Figure 1 varies automatically the flow of bottoms to the furnace, which is maintained at a constant discharge pressure.

As now will be more fully described in connection with the operation of Figure 2, the flow to the furnace is preset and the pressure on the furnace is automatically controlled.

Referring now to Figure 2, temperature recorder controller 7 actuates pressure recorder controller 21, which controls valve 22 in pipe 23, which returns the furnace effluent to deisobutanizer 2.

Isobutane analyzer 24, which analyzes the isobutane bottoms passed from the system by way of pipe 4 and valve 6, resets the temperature recorder controller 7 as described below. Flow recorder controller 25 operates valve 26 in pipe 27 to maintain a predetermined flow to furnace 28 in which heating pipe 29 is located. As described in connection with Figure 1, temperature recorder controller 16 operates valve 14, responsive to the temperature of the effluent from the furnace and, therefore, the fuel which is passed to the burner by way of pipe 13.

Assuming feed to the tower to increase at a constant quality, the tower bottom temperature will begin to lower. This, via temperature recorder controller 7, will actuate pressure recorder controller 21 to effect further opening of valve 22, which, in turn, decreases the pressure in the furnace, which change, at the same fuel quantity to the furnace, causes additional vaporization of liquid in coil 29, which, in turn, will cause a drop in the effluent temperature to below, in this case, the preset temperature of 400° F. At this lower furnace outlet temperature, temperature recorder controller 16 will reestablish the effluent outlet temperature at 400° F., as described in connection with Figure 1. With reference to the table herein, assuming an increase from 100 pounds per unit of time of original feed to 105 maximum feed, the effluent from the furnace at the desired 400° F. contains 24 pounds of vapor (2 pounds isobutane and 22 pounds normal butane) per unit of time and 218 pounds (18 pounds normal butane and 200 pounds alkylate) of liquid per unit of time, as will be understood by one skilled in the art in possession of this disclosure, the additional heat added to the furnace via the additional fuel at maximum feed as compared with the original operation is necessary due to the increased feed in the maximum feed situation. The flow through the furnace at maximum feed is at the same quantity, i.e., 242 pounds per unit of time at 400° F. but the vapor content is greater at maximum feed than in the original operation, which results in charging to the tower 26,100 B.t.u's per unit of time at maximum feed as compared with 24,890 B.t.u.'s at original feed. This additional heat is carried into the tower in the additional vapors formed upon the opening of valve 22 and is, therefore, present in the tower in the form of latent heat.

Obviously, due to the pressure drop across valve 22, there has been additional vaporization of furnace effluent, which causes the total stream being returned to the tower to be returned at a lower temperature although the furnace effluent temperature has remained the same, i.e., 400° F. Thus, while the heat content in the expanded stream is the same as the furnace effluent, that is, the heat content of the stream remains constant, as is known in the art, heat required as latent heat to produce the additional vapor from the stream itself has resulted in a cooler stream containing more vapor and less liquid.

Further referring to the table, at the maximum feed, when there is also an increase of normal butane (less isobutane), the tower will require a decrease in heat over the immediately preceding situation. This will be true because there will be less isobutane to vaporize in the tower. Thus, when the quality of the feed changes the tower bottom temperature will tend to increase and the percent of isobutane in the bottoms yield in pipe 4 will tend to decrease below an economical preset quantity or proportion. The decrease is sensed by analyzer 24, which will reset temperature recorder controller 7 to a lower demand, i.e., 245° F. instead of the original tower bottom temperature of 250° F. The pressure recorder controller 21 sensing this, through being reset by temperature recorder controller 7, will close somewhat valve 22 in pipe 23 leading the furnace effluent to the tower. This effects an increase in the furnace pressure and a corresponding decrease in vaporization within the furnace. As the amount of vaporization is decreasing, the furnace temperature will tend to increase to above the preset 400° F., which causes temperature recorder controller 16 to cut the fuel to the burner somewhat to re-establish an effluent temperature of 400° F. At this time, the effluent at 400° F. and 242 pounds per unit of time will contain only 11.2 pounds (2.0 isobutane and 9.2 normal butane) of vapor and 230.8 pounds (30.8 normal butane and 200 alkylate) of liquid. The heat content of this furnace effluent is 25,320 B.t.u.'s per unit of time and results in the 245° F. bottom tower temperature.

In the following table, in which the foregoing data are summarized together with additional information or data, it will be seen that the ratio of furnace charge to bottoms yield ranges from 10:1 at original operation to 9.25:1 at maximum feed with a normal butane increase, which is well within the desired range of about 8:1 to 10:1. It will be noted, upon viewing the table, that the three operations describe the charge to and from the furnace in terms of total pounds per unit of time, which remains constant at 242.

In the original operation, as can be noted from the table, the heat duty on the furnace is 24,890 B.t.u.'s per unit of time, the furnace contains 4.2 pounds of vapor and 237.8 pounds of liquid. In the operation described, pressure in the deisobutanizer is maintained at 100 p.s.i.g.

The pressure upstream of valves 18 and 22 will, of course, be somewhat above that in tower 2. This pressure is preset in the Figure 1 operation to about 450 p.s.i.g. and, at times, can vary within the range 425–475 p.s.i.g. In the Figure 2 operation, the pressure head of valve 22 is approximately 450 p.s.i.g. and during operation can vary in the range 425–475 p.s.i.g. As one skilled in the art in possession of this disclosure will understand, this operation can be effected upon various feeds, in which event, conditions will be correspondingly altered.

The figures of the drawing are intended for disclosure purposes and, obviously, do not represent detailed engineering drawings, which would, of course, contain more detail, which here does not form any part of the invention and is, therefore, omitted for sake of simplicity.

Further, the automatic controller equipment as indicated at 7, 8, 16, 17, 21, 24, and 25 is conventional and available commercially.

In the operation of Figure 2, as described, the isobutane analyzer is preset at the optimum quantity of isobutane for economic separation. In the example described this is about 0.83 isobutane in the bottoms yield. Whenever the quality of the feed to the Figure 2 operation does not change the analyzer 24 will, of course, remain static and the tower bottom temperature will remain at 250° F., its original temperature.

At the present time, the modus operandi of Figure 2 is preferred. Among other reasons this operation permits constant consideration and response to the isobutane in the bottoms yield from deisobutanizer 2. Also, there is no time delay in correcting for changes in the feed; and the operation is effected at constant optimum defluorinating conditions of temperature, pressure, and recycle rate.

Reasonable variation and modification are possible within the scope of the foregoing disclosure, the drawings, and the appended claims, the essence of which is that there have been provided a method and apparatus for operating a fractionation zone and a heating zone which supplies heat to said fractionation zone, in which the heating zone effluent is maintained at a constant temperature while the pressure thereon is maintained constant and the rate of flow of liquid from the fractionation zone to the heating zone and back again is controlled responsive to the desired bottoms temperature of said fractionation zone; or wherein the rate of flow from the fractionation zone to the heating zone and back to the fractionation zone is controlled to a constant flow rate while the pressure on the heating zone effluent is varied responsive to a desired temperature of the bottoms in said fractionation zone, and in the last described variation wherein the value at which the pressure is controlled responsive to said temperature is determined by analyzing Table

|  | Original | | | | | Maximum Feed | | | | | Maximum Feed with nC4 Increase | | | | |
|---|---|---|---|---|---|---|---|---|---|---|---|---|---|---|---|
|  | Feed | Overhead Yield | Bottoms Yield | To Furnace | From Furnace | Feed | Overhead Yield | Bottoms Yield | To Furnace | From Furnace | Feed | Overhead Yield | Bottoms Yield | To Furnace | From Furnace |
| iC$_4$ Vapor | | 74.8 | | | 2.0 | | 78.54 | | | 2.0 | | 77.78 | | | 2.0 |
| iC$_4$ Liquid | 75.0 | | 0.2 | 2.0 | | 78.75 | | 0.21 | 2.0 | | 78.0 | | 0.22 | 2.0 | |
| nC$_4$ | | 1.0 | | | 2.2 | | 1.05 | | | 22.0 | | 1.04 | | | 9.2 |
| nC$_4$ Liquid | 5.0 | | 4.0 | 40.0 | 37.8 | 5.25 | | 4.20 | 40.0 | 18.0 | 6.0 | | 4.96 | 45.8 | 30.8 |
| Alkylate liquid | 20.0 | | 20.0 | 200.0 | 200.0 | 21.00 | | 21.00 | 200.0 | 200.0 | 21.0 | | 21.00 | 194.2 | 200.0 |
| Total | 100.0 | 75.8 | 24.2 | 242.0 | 242.0 | 105.00 | 79.59 | 25.41 | 242.0 | 242.0 | 105.0 | 78.82 | 26.18 | 242.0 | 242.0 |

| Flow rates | Pounds Per Unit of Time | | |
|---|---|---|---|
| Reboiler/bottoms wt. ratio | 10:1 | 9.5:1 | 9.25:1 |
| Fractionator: | | | |
| Pressure, p.s.i.g. | 100 | 100 | 100 |
| Bottom Temp. °F. | 250 | 250 | 245 |
| Furnace Temp. outlet, °F. | 400 | 400 | 400 |
| B.t.u. | 24,890 | 26,100 | 25,320 | the bottoms from said fractionation zone thus to maintain a desired value for said analysis.

I claim:

1. In a fractionation operation wherein a stream is taken from a fractionation zone, heated and returned to said zone, the steps in combination as follows:

Feeding a liquid to be fractionated to said zone, removing a fractionated liquid product from said zone responsive to level of said fractionated product in said zone, passing from said zone to a heating zone a portion of said fractionated product taken from said zone; heating said product in said heating zone and controlling the effluent temperature of said heating zone to a constant predetermined value, maintaining pressure on said effluent at a constant predetermined value which is above the pressure in said fractionating zone, then expanding said effluent into said fractionation zone, and controlling the rate of flow of said fractionated product from said fractionation zone to said heating zone and back to said fractionation zone responsive to a predetermined temperature of said fractionated product in said fractionation zone.

2. In a fractionation operation wherein a stream is taken from a fractionation zone, heated and returned to said zone, the steps in combination as follows:

Feeding a liquid to be fractionated to said zone, removing a fractionated liquid product from said zone responsive to level of said fractionated product in said zone, passing from said zone to a heating zone a portion of said fractionated product from said zone;

in said heating zone heating said product therein to a predetermined heating zone effluent temperature, controlling the pressure on said effluent at a variable pressure responsive to a predetermined temperature of said fractionated product in said fractionation zone, and controlling the rate of flow of said fractionated product from said fractionating zone to said heating zone and back to said fractionating zone to a predetermined value.

3. A method according to claim 2 wherein the pressure of the heating zone effluent is controlled responsive to said predetermined temperature in said fractionation zone but in which the pressure, at which said furnace effluent is controlled, is redetermined responsive to the quality of said fractionated product from said fractionation zone responsive to said level of said product in said zone.

4. A process for the thermal defluorination of an HF alkylation effluent, which is being subjected to deisobutanization, the steps in combination as follows:

Removing an at least partially deisobutanized fraction from a deisobutanization zone, passing said fraction to a heating zone, heating said fraction in said heating zone and controlling the effluent temperature of said heating zone to a constant predetermined value suitable for defluorination of said fraction, returning said thus heated fraction to said deisobutanization zone, and maintaining a constant temperature of said fraction in said deisobutanization zone by controlling the pressure of said effluent at a constant predetermined value which is above the pressure in said deisobutanization zone, then expanding said effluent into said deisobutanization zone, and controlling the rate of flow of said fraction from said deisobutanization zone to said heating zone and back to said deisobutanization zone responsive to a predetermined temperature of said fraction in said deisobutanization zone.

5. A process for the thermal defluorination of an HF alkylation effluent, which is being subjected to deisobutanization, the steps in combination as follows:

Removing an at least partially deisobutanized fraction from a deisobutanization zone, passing said fraction to a heating zone, in said heating zone heating said fraction to a constant heating zone effluent temperature suitable for defluorination of said fraction, returning said thus heated fraction to said deisobutanization zone, and maintaining a constant temperature of said fraction in said deisobutanization zone by controlling the pressure of said heating zone effluent returned to said deisobutanization zone responsive to the temperature of said fraction in said deisobutanization zone, and controlling the rate of flow of said fraction from said deisobutanization zone to said heating zone and back to said deisobutanization zone to a predetermined value.

6. An apparatus suitable for the thermal defluorination of an HF alkylation effluent undergoing deisobutanization comprising, in combination, means for deisobutanizing said effluent, means for heating an at least partially deisobutanized effluent, means for passing an at least partially deisobutanized effluent from said means for deisobutanizing to said means for heating, means upon said means for heating for maintaining a constant temperature of said effluent therefrom, means for returning said effluent from said heating means to said means for deisobutanizing, means upon said means for returning heated effluent to control the pressure of said heated effluent to a constant predetermined value, means upon said means for deisobutanizing to sense the temperature of effluent undergoing deisobutanization in said means for deisobutanizing and means responsive to said means for sensing said temperature for controlling the rate of flow of an at least partially deisobutanized effluent from said means for deisobutanizing to said heating means and back to said means for deisobutanizing.

7. An apparatus suitable for the thermal defluorination of an HF alkylation effluent undergoing deisobutanization comprising, in combination, means for deisobutanizing said effluent, means for heating an at least partially deisobutanized effluent, means for passing an at least partially deisobutanized effluent from said means for deisobutanizing to said means for heating, means upon said means for heating for maintaining a constant temperature of said effluent therefrom, means for returning said effluent from said heating means to said means for deisobutanizing, means upon said means for returning heated effluent to control the pressure of said heated effluent, means upon said means for deisobutanizing to sense the temperature of an at least partially deisobutanized effluent in said means for deisobutanizing, means upon said means to control the pressure to render said means to control the pressure responsive to said temperature sensing means, and means upon said means for passing an at least partially deisobutanized effluent to said heating zone for controlling the rate of flow through said means for passing to a constant predetermined value.

8. An apparatus according to claim 7 wherein means are provided upon said deisobutanizer for analyzing the isobutane content of said at least partially deisobutanized effluent leaving said deisobutanizer.

References Cited in the file of this patent

UNITED STATES PATENTS 2,277,070     Carney _____ Mar. 24, 1942
2,759,032     Dixon _____ Aug. 14, 1956

OTHER REFERENCES

Wilson: Oil and Gas Journal, December 9, 1948, pp. 75–82.